(12) United States Patent
Sigafoose (10) Patent No.: US 10,946,455 B2
(45) Date of Patent: Mar. 16, 2021

(54) KEYLESS CHUCK ASSEMBLY

(71) Applicant: MILWAUKEE ELECTRIC TOOL CORPORATION, Brookfield, WI (US)

(72) Inventor: Tyler S. Sigafoose, Pewaukee, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 16/530,318

(22) Filed: Aug. 2, 2019

(65) Prior Publication Data

US 2020/0038966 A1 Feb. 6, 2020

Related U.S. Application Data

(60) Provisional application No. 62/714,317, filed on Aug. 3, 2018.

(51) Int. Cl.
*B23B 31/20* (2006.01)
*B27C 5/10* (2006.01)

(52) U.S. Cl.
CPC .............. *B23B 31/201* (2013.01); *B27C 5/10* (2013.01); *Y10T 279/17538* (2015.01); *Y10T 409/309408* (2015.01)

(58) Field of Classification Search
CPC ........... B23B 31/201; Y10T 279/17529; Y10T 279/17538; Y10T 409/309408
See application file for complete search history.

(56) References Cited

U.S. PATENT DOCUMENTS

| | | | |
|---|---|---|---|
| 2,784,976 A * | 3/1957 | Ondeck | B23B 31/1253 |
| | | | 279/48 |
| 3,162,221 A | 12/1964 | Lacey | |
| 3,179,136 A | 4/1965 | De Santis | |
| 3,587,387 A | 6/1971 | Burrows et al. | |
| 3,810,641 A | 5/1974 | Benjamin | |
| 3,811,361 A | 5/1974 | Seely et al. | |
| 3,894,743 A * | 7/1975 | Hiroumi | B23B 31/20 |
| | | | 279/47 |
| 4,947,908 A | 8/1990 | O'Banion et al. | |
| 5,464,229 A | 11/1995 | Salpaka | |
| 5,620,188 A | 4/1997 | McCurry et al. | |
| 5,755,448 A | 5/1998 | Kanaan et al. | |
| 5,788,248 A * | 8/1998 | Gibson | B23B 31/201 |
| | | | 279/140 |
| 5,820,136 A | 10/1998 | Han et al. | |

(Continued)

FOREIGN PATENT DOCUMENTS

| | | |
|---|---|---|
| CN | 103878419 A | 6/2014 |
| DE | 8903450 U1 | 8/1989 |

(Continued)

*Primary Examiner* — Eric A. Gates
(74) *Attorney, Agent, or Firm* — Michael Best & Friedrich LLP (57) ABSTRACT

A keyless chuck for attaching a tool bit to a power tool includes a knob having a central aperture and defining a longitudinal axis, a hub within the central aperture and configured to attach to the power tool, and a collet within the hub and having a receiving end configured to receive the tool bit. The knob is adjustable between a locked position in which a clamping force is applied to the collet to retain the tool bit therein, and an unlocked position in which the clamping force is relieved to permit removal of the tool bit.

17 Claims, 8 Drawing Sheets

(56) References Cited

U.S. PATENT DOCUMENTS

| | | | |
|---|---|---|---|
| 5,826,888 A | 10/1998 | Weaver et al. | |
| 5,921,563 A * | 7/1999 | Huggins | B23B 31/14 |
| | | | 279/131 |
| 5,944,327 A * | 8/1999 | Kanaan | B23B 31/201 |
| | | | 279/51 |
| 5,997,225 A | 12/1999 | Young et al. | |
| 5,998,897 A | 12/1999 | Boston et al. | |
| 6,045,306 A | 4/2000 | Buddendeck et al. | |
| 6,079,916 A | 6/2000 | Grayson et al. | |
| 6,079,918 A | 6/2000 | Buddendeck et al. | |
| 6,179,512 B1 * | 1/2001 | Gibson | B23B 31/201 |
| | | | 279/140 |
| 6,224,305 B1 | 5/2001 | Huggins | |
| 6,244,797 B1 | 6/2001 | Wheeler | |
| 6,332,619 B1 | 12/2001 | DeRosa | |
| 6,350,087 B1 * | 2/2002 | Berry | B23B 31/001 |
| | | | 144/154.5 |
| 6,520,508 B1 | 2/2003 | Jordan | |
| 6,558,090 B2 | 5/2003 | Lagaly et al. | |
| 6,792,984 B2 | 9/2004 | Fontaine | |
| 6,880,832 B2 | 4/2005 | DeRosa | |
| 6,913,429 B1 | 7/2005 | Phillips et al. | |
| 6,932,357 B2 * | 8/2005 | Jacobs | B23B 31/201 |
| | | | 279/42 |
| 6,939,213 B2 | 9/2005 | Lovchik et al. | |
| 7,140,817 B1 | 11/2006 | Phillips et al. | |
| 7,316,529 B2 | 1/2008 | Phillips et al. | |
| 7,766,586 B2 | 8/2010 | DeRosa | |
| 7,784,507 B2 | 8/2010 | Gass et al. | |
| 7,984,734 B2 | 7/2011 | Cepress et al. | |
| 8,047,242 B2 | 11/2011 | Wall et al. | |
| 8,628,280 B2 | 1/2014 | Ceroll et al. | |
| 8,678,725 B2 | 3/2014 | Ceroll et al. | |
| 8,851,812 B1 | 10/2014 | DeRosa | |
| 9,238,270 B2 | 1/2016 | Ceroll et al. | |
| 9,492,875 B2 | 11/2016 | Ceroll et al. | |
| 9,724,767 B2 | 8/2017 | Ceroll et al. | |
| 2003/0056853 A1 | 3/2003 | Gass et al. | |
| 2005/0200087 A1 | 9/2005 | Vasudeva et al. | |
| 2005/0260052 A1 | 11/2005 | Lovchik et al. | |
| 2006/0157155 A1 | 7/2006 | Robinson | |
| 2011/0121522 A1 | 5/2011 | DeRosa | |
| 2012/0169017 A1 * | 7/2012 | Mack | B23B 31/201 |
| | | | 279/52 |
| 2017/0326654 A1 | 11/2017 | Ceroll et al. | |

FOREIGN PATENT DOCUMENTS

| | | |
|---|---|---|
| DE | 9422037 U1 | 9/1997 |
| DE | 102012223910 A1 | 6/2014 |
| EP | 625393 B1 | 8/2002 |
| WO | 9532830 A1 | 12/1995 |
| WO | 2016173987 A1 | 11/2016 |

* cited by examiner

KEYLESS CHUCK ASSEMBLY

CROSS-REFERENCE TO RELATED APPLICATIONS

This application claims priority to U.S. Provisional Patent Application No. 62/714,317 filed on Aug. 3, 2018, the entire content of which is incorporated herein by reference.

FIELD OF THE INVENTION

The present invention relates to chucks, such as those used in conjunction with routers.

BACKGROUND OF INVENTION

Tool bit holders for woodworking routers typically include a chuck having a collet and a nut. In such chucks, tightening the nut applies a clamping force to the collet and a tool bit contained therein to secure the tool bit within the router spindle. Typically, these chucks require separate tools (e.g., a wrench) to tighten or loosen the nut, and the nut must be tightened and loosened every time a tool bit change is performed.

SUMMARY OF THE INVENTION

The present invention provides, in one aspect, a keyless chuck for attaching a tool bit to a power tool. The keyless chuck includes a knob having a central aperture and defining a longitudinal axis, a hub within the central aperture and configured to attach to the power tool, and a collet within the hub and having a receiving end configured to receive the tool bit. The knob is adjustable between a locked position in which a clamping force is applied to the collet to retain the tool bit therein, and an unlocked position in which the clamping force is relieved to permit removal of the tool bit.

The present invention provides, in another aspect, a router configured to attach to a tool bit. The router includes a motor unit including a spindle, and a keyless chuck for attaching the tool bit to the spindle. The keyless chuck includes a knob having a central aperture and defining a longitudinal axis, a hub within the central aperture and configured to attach to the power tool, and a collet within the hub and having a receiving end configured to receive the tool bit. The knob is adjustable between a locked position in which a clamping force is applied to the collet to retain the tool bit therein, and an unlocked position in which the clamping force is relieved to permit removal of the tool bit.

Other features and aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

FIGS. 1-13 illustrate all or portions of a woodworking router including a motor unit 14 and a keyless chuck 18 in accordance with an embodiment of the invention. As will be described in further detail below, the chuck 18 is attached to the motor unit 14 and further configured to selectively receive a cutting tool (e.g., a router bit).

Figure 1:
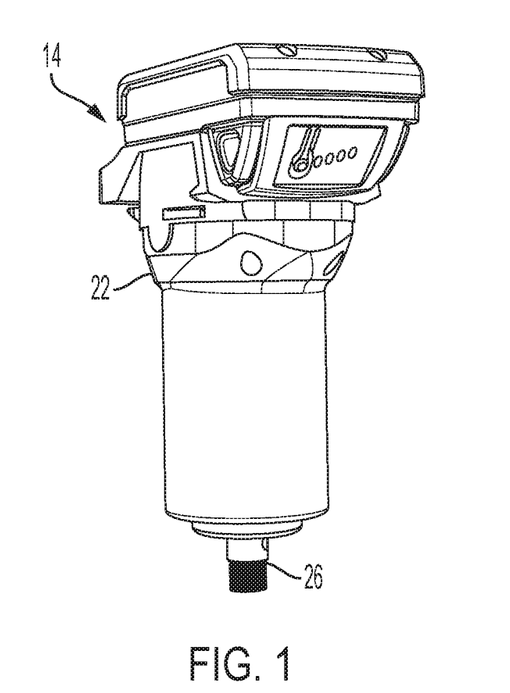
FIG. 1 is a perspective view of a motor unit of a router.
Figure 2:
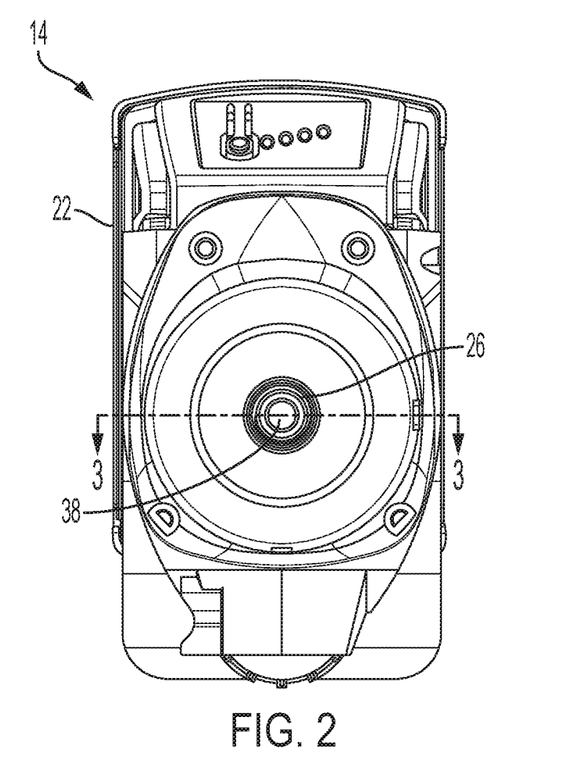
FIG. 2 is a bottom view of the motor unit of FIG. 1.
Figure 3:
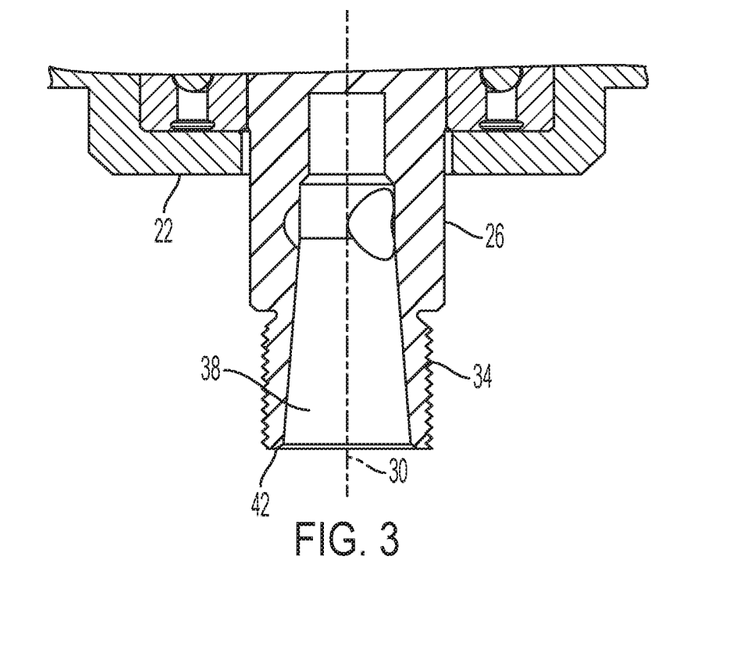
FIG. 3 is a partial cross sectional view of the motor unit of FIG. 1, taken along the line 3-3 in FIG. 2.

With reference to FIGS. 1-3, the motor unit 14 includes a body 22 and a spindle 26 extending from the body 22 to define a rotational axis 30. A motor (not shown) is housed within the body 22 and rotationally coupled to the spindle 26 to supply torque to the spindle 26 during operation of the motor unit 14. The spindle 26 is a cylindrical shaft with an exterior threaded surface 34, a tapered internal bore 38, and a distal end 42 oriented orthogonal to the rotational axis 30.

Figure 4:
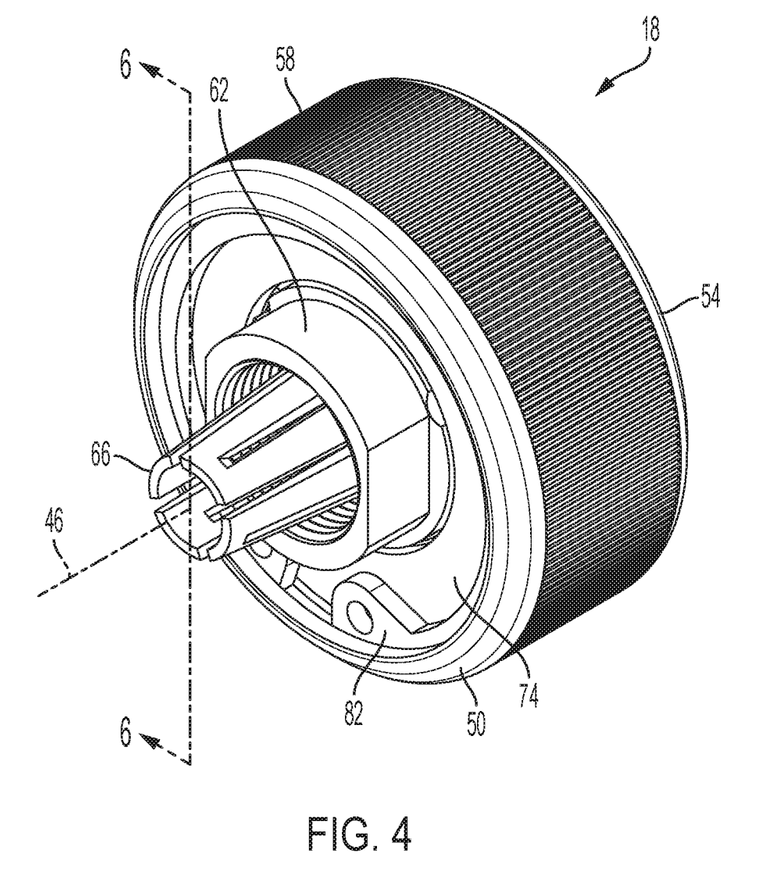
FIG. 4 is a perspective view of a keyless chuck assembly to be used with the router of FIG. 1.

With reference to FIG. 4, the chuck 18 is generally cylindrical and defines a longitudinal axis 46. The chuck 18 is attached to the spindle 26 for co-rotation with the spindle 26 during operation of the motor unit 14, and when coupled thereto, the longitudinal axis 46 and the rotational axis 30 are coaxial. When the chuck 18 is coupled to the spindle 26, an upper end 50 of the chuck 18 faces toward the motor unit 14, and a lower end 54 of the chuck 18 faces away from the motor unit 14.

Figure 5:
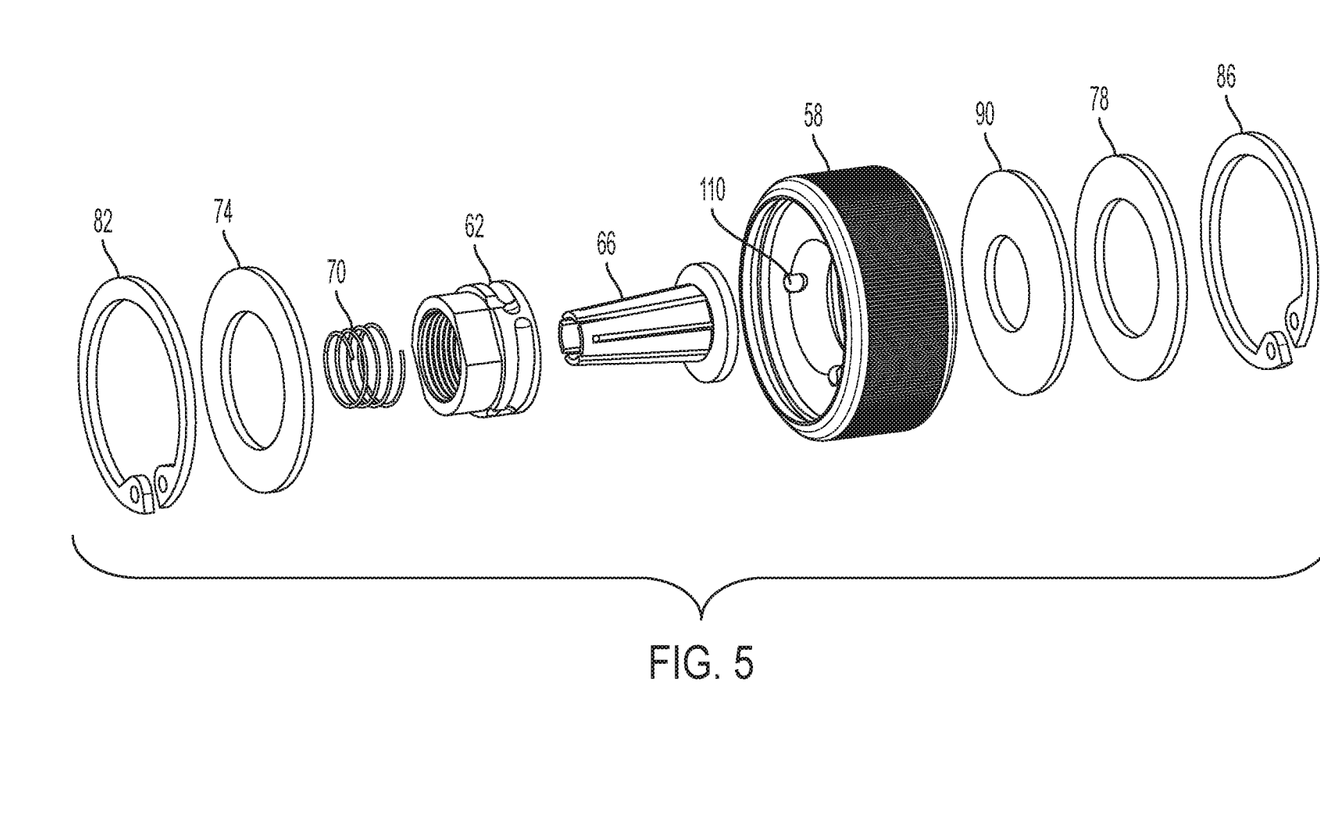
FIG. 5 is an exploded view of the chuck of FIG. 4.
Figure 6:
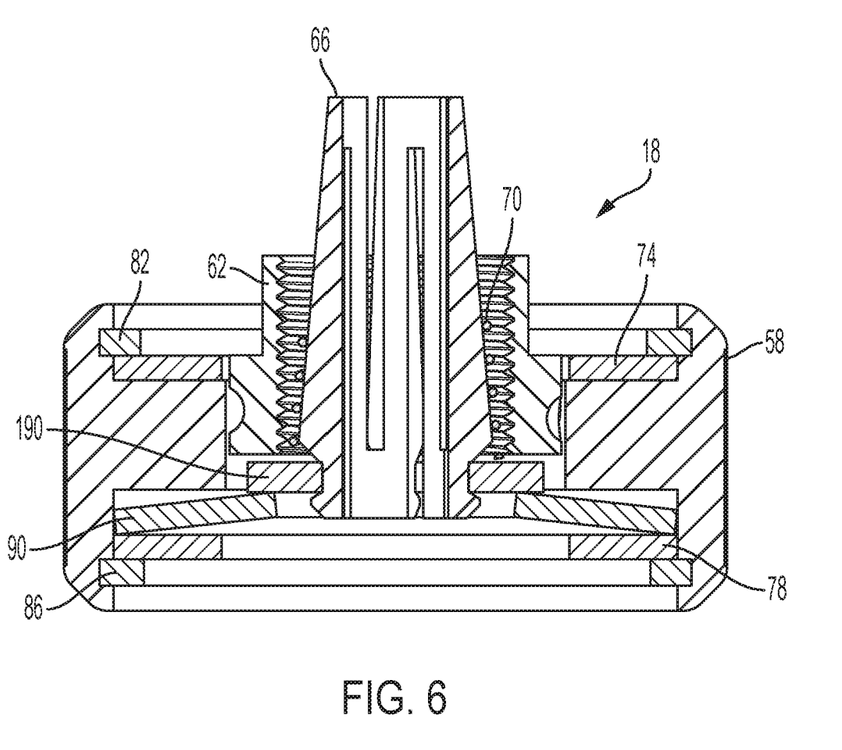
FIG. 6 is a cross-sectional view of the chuck of FIG. 4, taken along line 6-6 in FIG. 4.

With reference to FIGS. 4-6, the chuck 18 includes a generally ring-shaped knob 58 having a central aperture 98 (FIG. 8), a hub 62 that partially resides within the central aperture 98, a collet 66 extending through the hub 62 and receivable within the bore 38, and a coil spring 70 within the hub 62 and surrounding the collet 66. In addition, the chuck 18 includes upper and lower washers 74, 78, upper and lower retaining rings 82, 86, and a disk spring 90 (i.e., a Belleville washer), all situated within the knob 58.

Figure 7:
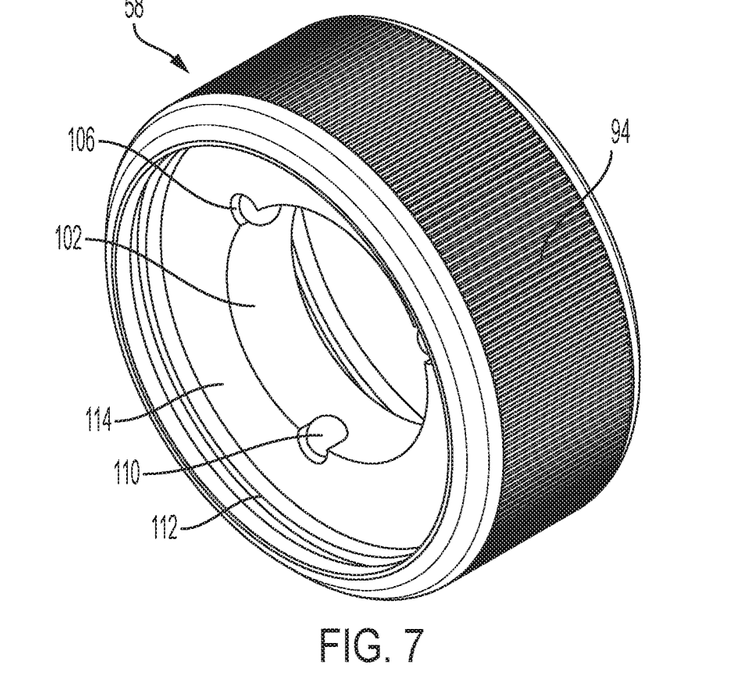
FIG. 7 is a perspective view of a knob of the chuck of FIG. 4.
Figure 8:
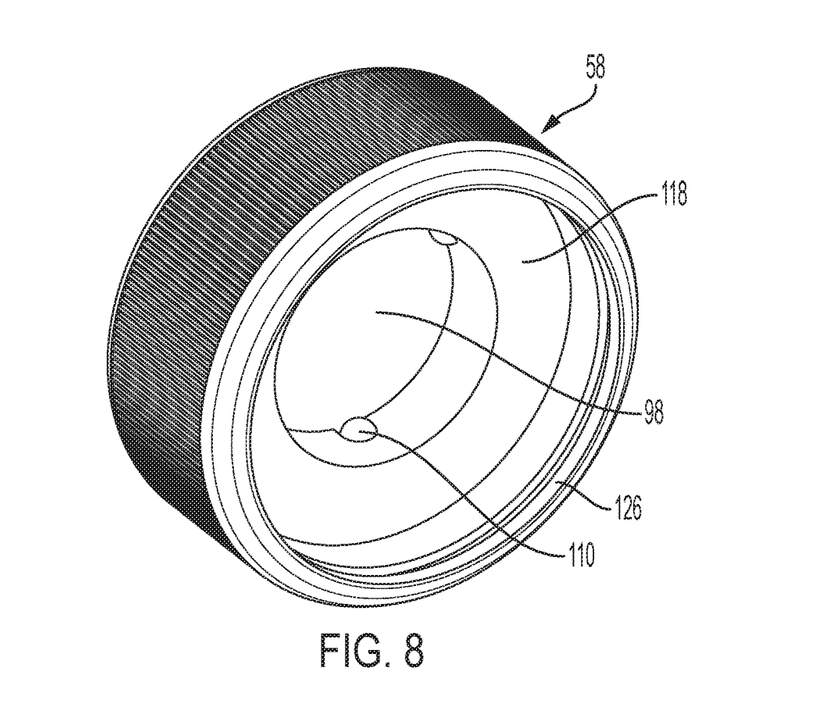
FIG. 8 is another perspective view of the knob of FIG. 7.

With reference to FIGS. 7 and 8, the knob 58 is a cylindrical member that includes a circumferential exterior surface 94. The central aperture 98 extends along the longitudinal axis 46 and is defined by a smooth inner circumferential wall 102. Three indentations 106 are spaced evenly about the circumference of the inner wall 102. The indentations 106 partially receive ball bearings 110, so that a portion of each ball bearing 110 protrudes radially inward toward the longitudinal axis 46.

With continued reference to FIGS. 7 and 8, the knob 58 also includes an upper counterbore 114 and a lower counterbore 118, with the lower counterbore 118 being deeper than the upper counterbore 114. An upper annular groove 122 is located adjacent the upper counterbore 114, and a lower annular groove 126 is located adjacent the lower counterbore 118.

Figure 9:
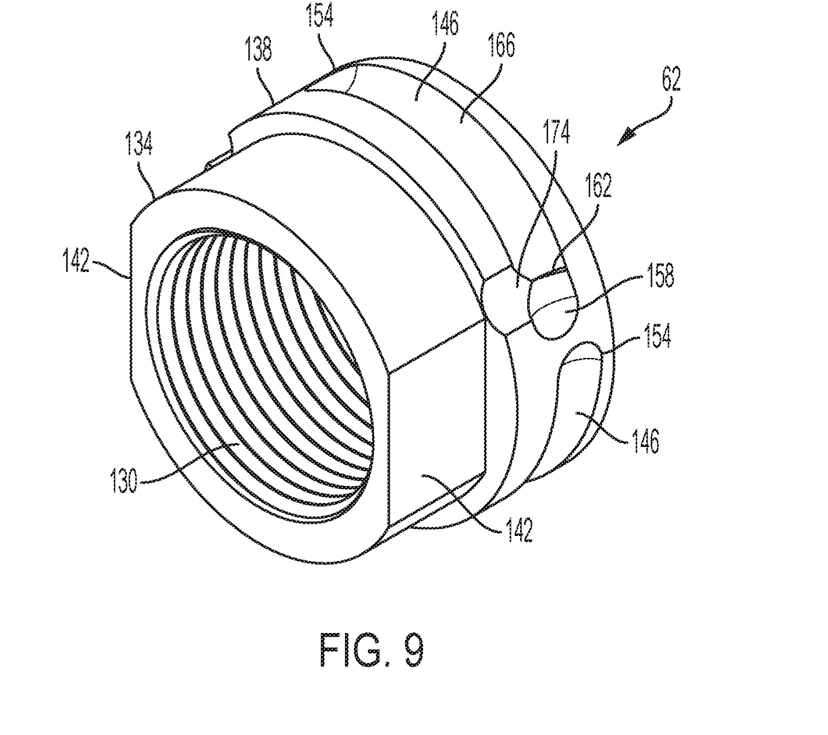
FIG. 9 is a perspective view of an inner threaded part of the chuck of FIG. 4.
Figure 10:
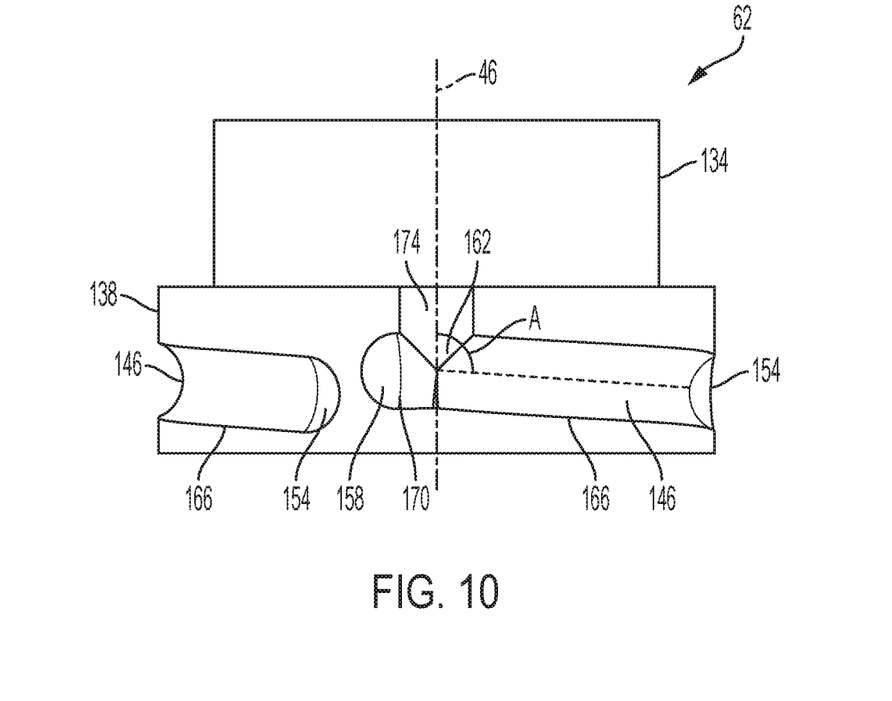
FIG. 10 is a side view of the inner threaded part of FIG. 9.

With reference to FIGS. 9 and 10, the hub 62 is generally cylindrical and includes a central threaded bore 130 extending along the longitudinal axis 46. The hub 62 has an upper portion 134 and a lower portion 138. The upper portion 134 includes two wrench flats 142 that run parallel to each other and to the longitudinal axis 46. The lower portion 138 includes three circumferential slots 146 equally spaced about the circumference of the hub 62. Each of the slots 146 defines a pathway that has a first end 154, a second end 158, and a transition region 162. Each of the slots 146 has an inclined region 166 extending between the first end 154 and the transition region 162, where the inclined region 166 is sloped towards the upper portion 134 from the first end 154 to the transition region 162, where the orientation of the slot 146 flattens and becomes transverse to the axis 46. Each of the slots 146 also has a detent 170 extending between the transition region 162 and the second end 158 in which a corresponding ball bearing 110 is received. An insertion groove 174 is formed in the lower portion 138 and located adjacent the transition region 162 to facilitate insertion of the ball bearings 110 into the respective slots 146 during assembly of the chuck 18.

With reference to FIG. 10, the inclined region 166 of each slot 146 defines an oblique reference angle A with respect to the longitudinal axis 46. In other words, the inclined region 166 of each slot 146 is obliquely oriented relative to the longitudinal axis 46. Although not shown in FIG. 10, the detent 170 of each slot 146 is likewise obliquely oriented relative to the longitudinal axis 46.

Figure 11:
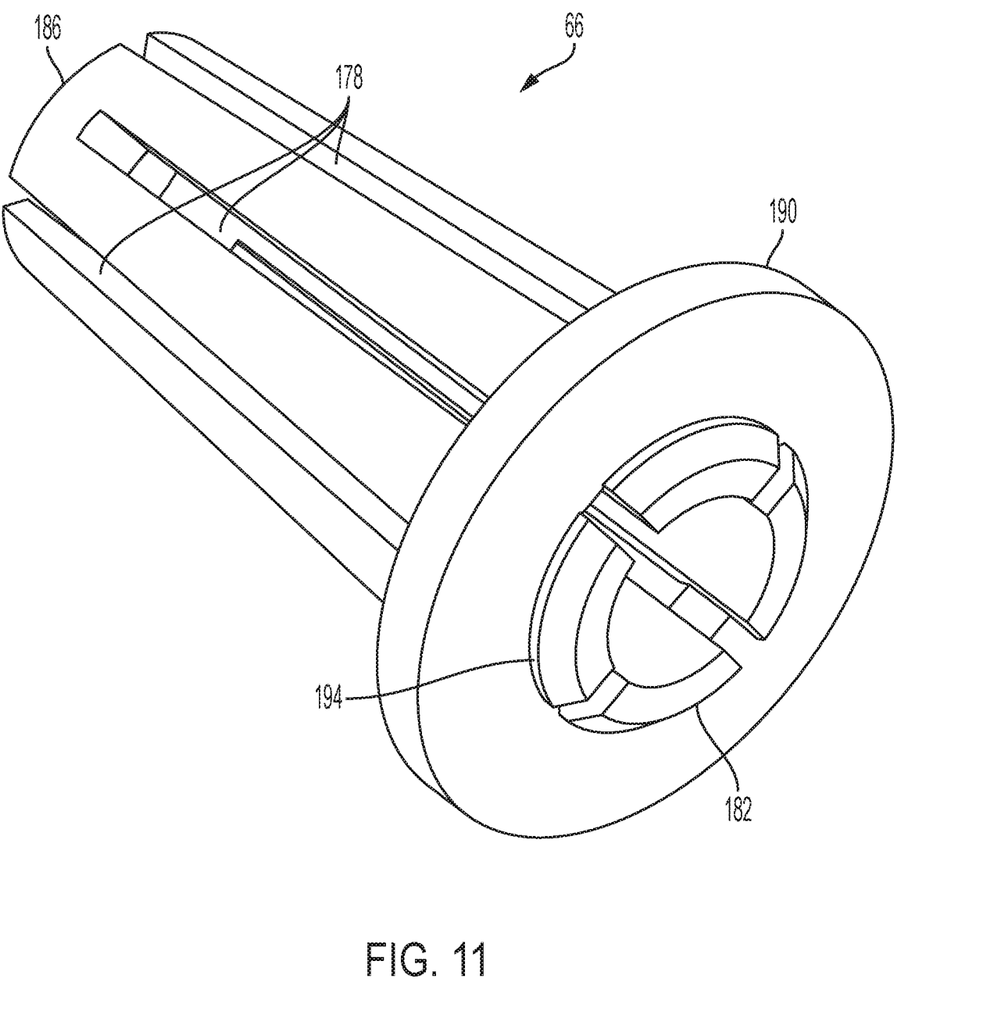
FIG. 11 is a perspective view of a collet of the chuck of FIG. 4.

With reference to FIG. 11, the collet 66 is a tapered one piece collet with alternating slots 178, allowing for contractible forces to be translated axially along the collet 66. The collet 66 includes a receiving end 182 to receive a tool bit shank (not shown) and an insertion end 186 received within the tapered bore 38 of the spindle 26. The collet 66 includes a captured washer 190 fitted into a ring 194 near the receiving end 182.

Referring to FIGS. 6-10, in assembly, the hub 62 is received into the central aperture 98 of the knob 58, such that the lower portion 138 is circumscribed by the inner wall 102. The knob 58 is aligned with the hub 62 so that the ball bearings 110 protrude partially into the slots 146 and are partially contained in the indentations 106. The upper washer 74 sits within the upper counterbore 114 and retains the ball bearings 110 in the slots 146, thereby retaining the hub 62 within the central aperture 98. The upper washer 74 is removable to allow the ball bearings 110 to be removed from the indentations 106. The upper retaining ring 82 snaps into the upper annular groove 122 to hold the upper washer 74 in place. The coil spring 70 resides inside the threaded bore 130 of the hub 62. The collet 66 passes through the threaded bore 130 and inside the coil spring 70. The captured washer 190 is sandwiched between the hub 62 and a radially inner portion of the disk spring 90. A radially outer portion of the disk spring 90 contacts the lower washer 78. The lower retaining ring 86 snaps into the lower annular groove 126, retaining the lower washer 78 and the disk spring 90 in the lower counterbore 118.

Once assembled, the chuck 18 is attached to the motor unit 14 by threading the threaded bore 130 onto the exterior threaded surface 34 of the spindle 26. The wrench flats 142 on the upper portion 134 are engageable by a tool (e.g., a wrench) to tighten the chuck 18 onto the spindle 26. As the chuck 18 is tightened onto the spindle 26, the insertion end 186 of the collet 66 is received in the tapered bore 38, and the distal end 42 of the spindle 26 compresses, thereby preloading the coil spring 70 against the captured washer 190 within the threaded bore 130.

In use, the chuck 18 is adjusted between a locked position (FIG. 12) and an unlocked position (FIG. 13) by rotating the knob 58 relative to the hub 62. As the knob 58 rotates, the ball bearings 110 traverse the slots 146 between the first end 154 and the second end 158. The knob 58 is rotated by hand through gripping the exterior surface 94 of the knob 58 and applying a torque. In some embodiments, a texture can be applied to the exterior surface 94 of the knob 58 that acts as a grip enhancer to increase the torque applied to the knob 58.

Figure 12:
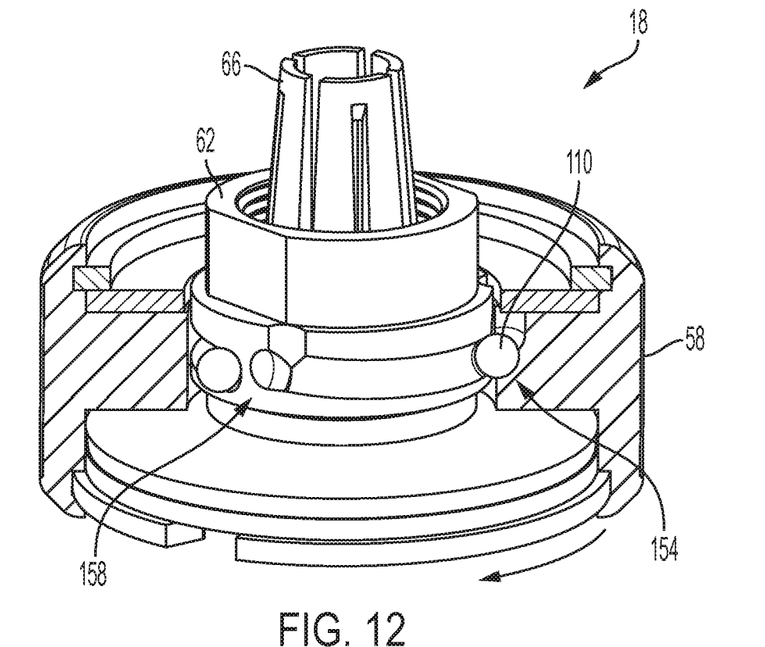
FIG. 12 is a perspective view of the chuck of FIG. 4 configured in a locked position.

With reference to FIG. 12, in the unlocked position, the ball bearings 110 reside in the slots 146 at the first end 154, such that the disk spring 90 is uncompressed and the collet 66 is loosely retained in the tapered bore 38 (FIG. 3). This allows for the shank of a tool bit (not shown) to be inserted into the receiving end 182 of the collet 66.

Figure 13:
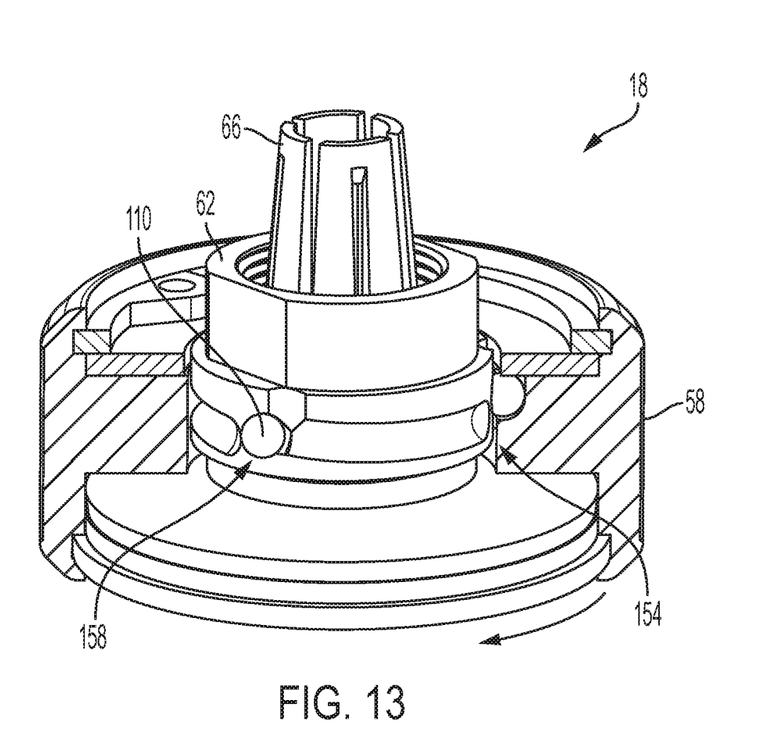
FIG. 13 is a perspective view of the chuck of FIG. 4 configured in an unlocked position.

With reference to FIGS. 12 and 13, the chuck 18 is adjusted to the locked position by rotating the knob 58 relative to the hub 62 so that the ball bearings 110 traverse the respective slots 146 from the first end 154, through the transition region 162, and to the second end 158. As the knob 58 rotates toward the locked position, the slope of the inclined region 166 (FIG. 10) causes the knob 58 to translate axially (relative to the hub 62) toward the upper end 50 (FIG. 4). Once the ball bearings 110 reach the second end 158, the bearings 110 fall into the respective detents 170 to retain the bearings 110 therein and thus, securing the knob 58 in the locked position. Thus, in the locked position, the knob 58 has moved axially upward in relation to the hub 62. Due to the arrangement of the knob 58, the lower retaining ring 86, lower washer 78, captured washer 190, and collet 66, the disk spring 90 is consequently compressed (i.e., flattened) by the lower washer 78 and, in turn, applies an axial preload force to the captured washer 190 to move the collet 66 further into the tapered bore 38. As the collet 66 is driven into the tapered bore 38, the collet 66 contracts in a radial direction to clamp and retain the shank of the tool bit (not shown) in the receiving end 182 of the collet 66. To remove the tool bit (not shown), the knob 58 can be rotated in the opposite direction relative to the hub 62 back to the unlocked position so that the ball bearings 110 travel back along the respective slots 146 to the first end 154, moving the knob 58 axially downward in relation to the hub 62, thereby permitting the disk spring 90 to rebound (i.e., return to its initial uncompressed shape) and relieve the force applied to the captured washer 190. This, in turn, decreases the force applied to the collet 66, allowing the collet 66 to expand and the tool bit shank (not shown) to be removed.

In this manner, the chuck 18 is manually adjustable by a user between the unlocked and locked positions without the use of any tools. As such, the user can quickly insert and clamp the tool bit, subsequently remove the tool bit, and replace the tool bit with another tool bit, simply by grasping and rotating the knob 58 with a single hand and without the use of tools between the unlocked and locked positions.

In the illustrated embodiment, the chuck 18 is provided with three grooves 122 in the hub 62, which correspond to three ball bearings 110 retained by indentations 106 within the knob 58. In other embodiments (not shown), the chuck 18 may be provided with fewer or more than three grooves 122 and corresponding ball bearings 110. In such embodiments having fewer than three grooves 122 and ball bearings 110 (e.g., having one or two grooves 122 and ball bearings 110; not shown), a circumferential extent of each groove 122 may be greater than that of embodiments having three or more grooves 122. Thus, embodiments having one or two grooves 122 may allow for a more gradual slope of each inclined region 166, and consequently require less force applied by the user to adjust the chuck 18 from the unlocked position to the locked position. Moreover, in embodiments having more than three grooves 122, the additional grooves may provide greater stability for the connection between the knob 58 and the hub 62.

Likewise, in the illustrated embodiment, the chuck 18 is provided with the grooves 122 located in the hub 62 and the indentations 106 located in the knob 58. In other embodiments (not shown), the grooves 122 may alternatively be located in the knob 58, and the indentations 106 may be located in the hub 62.

Various features of the invention are set forth in the following claims.

What is claimed is:

1. A keyless chuck for attaching a tool bit to a power tool, the power tool including a spindle having a tapered internal bore, the keyless chuck comprising:
    a knob having a central aperture and defining a longitudinal axis;
    a hub within the central aperture and configured to attach to the power tool, the hub having a threaded bore;
    a collet within the hub and having a receiving end configured to receive the tool bit; and
    a coil spring that resides within the threaded bore for biasing the collet outward from the tapered internal bore;
    wherein the knob is adjustable between a locked position in which a clamping force is applied to the collet to retain the tool bit therein, and an unlocked position in which the clamping force is relieved to permit removal of the tool bit;
    wherein the collet is received by the tapered internal bore, and wherein the collet advances into the tapered internal bore when the keyless chuck is adjusted from the unlocked position to the locked position.

2. The keyless chuck of claim 1, wherein the hub is configured to attach to the spindle.

3. The keyless chuck of claim 1, wherein the knob is adjustable between the locked position and the unlocked position by rotation of the knob relative to the hub about the longitudinal axis.

4. The keyless chuck of claim 3, wherein one of the knob and the hub includes a circumferential slot extending about a circumference thereof, wherein at least a portion of the circumferential slot is obliquely oriented relative to the longitudinal axis, and wherein the keyless chuck further comprises a ball bearing that protrudes partially into the slot.

5. The keyless chuck of claim 4, wherein the other of the knob and the hub includes an indentation, and the ball bearing is partially contained within the indentation.

6. The keyless chuck of claim 5, wherein the circumferential slot includes a first end and a second end, and the ball bearing traverses the slot between the first and second ends when the knob is rotated relative to the hub about the longitudinal axis.

7. The keyless chuck of claim 6, further comprising a disk spring within the knob for applying an axial preload force to the collet in response to adjustment of the knob from the unlocked position to the locked position.

8. The keyless chuck of claim 7, wherein the knob, when adjusted from the locked position to the unlocked position, permits the disk spring to rebound and relieve the axial preload force on the collet, and thus the clamping force, to permit removal of the tool bit.

9. The keyless chuck of claim 7, wherein the knob includes a lower counterbore, and wherein the keyless chuck further comprises a lower washer supported within the lower counterbore beneath the disk spring.

10. The keyless chuck of claim 9, further comprising a captured washer fitted to the collet adjacent the receiving end, wherein the disk spring is positioned between the captured washer and the lower washer.

11. The keyless chuck of claim 1, wherein the keyless chuck is configured to be adjusted between the unlocked position and the locked position without the use of tools.

12. A router configured to attach to a tool bit, the router comprising:
    a motor unit including a spindle having a tapered internal bore;
    a keyless chuck for attaching the tool bit to the spindle, the keyless chuck including
        a knob having a central aperture and defining a longitudinal axis;
        a hub within the central aperture and configured to attach to the spindle;
        a collet within the hub and received by the tapered internal bore and having a receiving end configured to receive the tool bit; and
        a disk spring within the knob;
    wherein the knob is adjustable between a locked position in which a clamping force is applied to the collet to retain the tool bit therein, and an unlocked position in which the clamping force is relieved to permit removal of the tool bit;
    wherein the collet advances into the tapered internal bore when the keyless chuck is adjusted from the unlocked position to the locked position; and
    wherein the disk spring applies an axial preload force to the collet in response to adjustment of the knob from the unlocked position to the locked position.

13. The router of claim 12, wherein the knob is adjustable between the locked position and the unlocked position by rotation of the knob relative to the hub about the longitudinal axis.

14. The router of claim 13, wherein the knob includes a circumferential exterior surface configured to be gripped by a user to apply torque to the knob to adjust the knob between the locked position and the unlocked position.

15. The router of claim 14, wherein the circumferential exterior surface includes a texture configured to enhance a grip of the user.

16. The router of claim 12, wherein one of the knob and the hub includes a circumferential slot extending about a circumference thereof, wherein the keyless chuck further comprises a ball bearing that protrudes partially into the slot, wherein the circumferential slot includes a first end and a second end, and wherein the ball bearing traverses the slot between the first and second ends when the knob is rotated relative to the hub about the longitudinal axis.

17. A keyless chuck for attaching a tool bit to a power tool, the power tool including a spindle having a tapered internal bore, the keyless chuck comprising:
    a knob having a central aperture and defining a longitudinal axis;
    a hub within the central aperture and configured to attach to the power tool;
    a collet within the hub and having a receiving end configured to receive the tool bit; and
    a disk spring within the knob;

wherein the knob is adjustable between a locked position in which a clamping force is applied to the collet to retain the tool bit therein, and an unlocked position in which the clamping force is relieved to permit removal of the tool bit, and wherein the disk spring applies an axial preload force to the collet in response to adjustment of the knob from the unlocked position to the locked position.

* * * * *